United States Patent
Yu

(10) Patent No.: US 11,394,871 B2
(45) Date of Patent: Jul. 19, 2022

(54) PHOTO TAKING CONTROL METHOD AND SYSTEM BASED ON MOBILE TERMINAL, AND STORAGE MEDIUM

(71) Applicant: HuiZhou TCL Mobile Communication Co., Ltd., HuiZhou (CN)

(72) Inventor: Lian Yu, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 201 days.

(21) Appl. No.: 16/646,583

(22) PCT Filed: Sep. 11, 2018

(86) PCT No.: PCT/CN2018/105119
§ 371 (c)(1),
(2) Date: Mar. 12, 2020

(87) PCT Pub. No.: WO2019/052450
PCT Pub. Date: Mar. 21, 2019

(65) Prior Publication Data
US 2020/0259994 A1    Aug. 13, 2020

(30) Foreign Application Priority Data
Sep. 13, 2017    (CN) .......................... 201710823115.4

(51) Int. Cl.
*H04N 5/232*        (2006.01)
*H04M 1/02*         (2006.01)
(Continued)

(52) U.S. Cl.
CPC ...... *H04N 5/23216* (2013.01); *H04M 1/0264* (2013.01); *H04M 1/72466* (2021.01); *H04W 4/025* (2013.01); *H04M 2250/52* (2013.01)

(58) Field of Classification Search
CPC ...................... H04N 5/23222; H04N 1/00183
(Continued)

(56) References Cited

U.S. PATENT DOCUMENTS 9,413,965 B2 *   8/2016   Ryu .................... H04N 5/23206
9,986,149 B2 *   5/2018   Chen .................. H04N 5/23222
(Continued)

FOREIGN PATENT DOCUMENTS

CN          105208266          12/2015
CN          105320242          2/2016
(Continued)

OTHER PUBLICATIONS

International Search Report and the Written Opinion dated Dec. 5, 2018 From the International Searching Authority Re. Application No. PCT/CN2018/105119 and Its Translation of Search Report Into English. (10 Pages).

*Primary Examiner* — Anthony J Daniels

(57) ABSTRACT

A photo taking control method and system based on a mobile terminal, and a storage medium. The method comprises: a photo sharing platform pre-stores photos and photos taking positions, and arranges the photos at the same position in descending order according to degrees of attention; a mobile terminal obtains position information of the current position of a user in real time and sends the position information to the photo sharing platform; when retrieving the stored photos at the same position according to the position information, the photo sharing platform sends ahead photos to the mobile terminal.

8 Claims, 2 Drawing Sheets

(51) Int. Cl.
*H04W 4/02* (2018.01)
*H04M 1/72466* (2021.01)

(58) Field of Classification Search
USPC .................................................. 348/207.99
See application file for complete search history.

(56) References Cited

U.S. PATENT DOCUMENTS

| | | | |
|---|---|---|---|
| 10,205,875 B2* | 2/2019 | Dellinger | G06T 5/005 |
| 2011/0292221 A1* | 12/2011 | Gu | H04N 5/23222 |
| | | | 348/207.1 |
| 2011/0314049 A1* | 12/2011 | Poirier | H04N 1/00183 |
| | | | 707/769 |
| 2013/0330007 A1* | 12/2013 | Kim | G06K 9/46 |
| | | | 382/195 |
| 2015/0189171 A1* | 7/2015 | Yim | H04N 5/23225 |
| | | | 348/207.1 |
| 2016/0080643 A1* | 3/2016 | Kimura | H04N 5/23222 |
| | | | 348/207.1 |
| 2016/0142625 A1* | 5/2016 | Weksler | H04N 5/23222 |
| | | | 348/222.1 |
| 2016/0142626 A1* | 5/2016 | Bostick | H04N 5/23222 |
| | | | 348/207.11 |
| 2017/0094160 A1* | 3/2017 | Bostick | H04N 5/23222 |
| 2017/0111574 A1* | 4/2017 | Miyashita | H04N 5/23216 |
| 2017/0180632 A1* | 6/2017 | Yang | H04N 5/232935 |
| 2020/0045165 A1* | 2/2020 | Luo | H04N 5/23293 |

FOREIGN PATENT DOCUMENTS

| | | |
|---|---|---|
| CN | 105554374 | 5/2016 |
| CN | 106357804 | 1/2017 |
| CN | 107026966 | 8/2017 |
| CN | 107483830 | 12/2017 |
| WO | WO 2012/137367 | 10/2012 |
| WO | WO-2016197734 A1 * | 12/2016 |
| WO | WO 2019/052450 | 3/2019 |

* cited by examiner

PHOTO TAKING CONTROL METHOD AND SYSTEM BASED ON MOBILE TERMINAL, AND STORAGE MEDIUM

RELATED APPLICATIONS

This application is a National Phase of PCT Patent Application No. PCT/CN2018/105119 having International filing date of Sep. 11, 2018, which claims the priority of Chinese Patent Application No. 201710823115.4, filed on Sep. 13, 2017 The contents of the above applications are all incorporated by reference as if fully set forth herein in their entirety.

FIELD AND BACKGROUND OF THE INVENTION

The present invention relates to information sorting and related database structure technical field, and more particularly, to a photo taking control method based on a mobile terminal, a system and a storage medium.

It is very common to utilize a mobile terminal to take photos. Compared with a digital camera, the performance of the mobile terminal is comparatively low. However, the mobile terminal has the following advantages: 1. It's simple to take a photo. There is no need to have a high technique to take a photo and thus it could be more widely used. 2. It's easy to carry and thus could be used to take a photo anytime.

Please note, although the mobile terminal allows the user to take a photo without professional techniques, this doesn't mean that the photographing technique is entirely unneeded. Without a doubt, a professional photographer could take a better photo with a better effect than an ordinary person. That is, if a user is more experienced in photography, then the camera function of a mobile terminal could be best used. However, not everyone could have extensive experiences. Thus, the camera function of the mobile terminal cannot be best used. Therefore, how to improve the usage rate of the camera function of the mobile terminal becomes a technical issue, which needs to be solved.

Thus, the conventional technique needs to be improved and developed.

SUMMARY OF THE INVENTION

One objective of an embodiment of the present invention is to provide a photo taking control method based on a mobile terminal, a system, and a storage medium, which could raise the effect of taken photo.

According to an embodiment of the present invention, a photo taking control method used in a mobile terminal is disclosed. The photo taking control method comprises: utilizing a photo sharing platform to pre-store a photo and a photo taking location, and descending sort photos corresponding to the photo taking location according to an attention degree; utilizing a mobile terminal to receive a user command to turn on a camera and real-time obtain location information of a current location of a user; utilizing the mobile terminal to send the location information to a photo sharing platform; and utilizing the photo sharing platform to sort and determine whether a photo of a same location is already stored according to the location information and send a photo sorted in a comparatively top position to the mobile terminal as a photo taking reference for the user if the photo is already stored.

According to an embodiment of the present invention, the step of real-time obtaining location information of the current location comprises:
real-time obtaining location information of the current location of the user according one or more of GPS positioning, LBS positioning, WiFi positioning, A-GPS positioning and GPS-one positioning.

According to an embodiment of the present invention, the step of utilizing the photo sharing platform to sort and determine whether the photo of the same location is already stored according to the location information comprises:
utilizing a network map to search a photo scene and sends a reference location and a reference photo-taking angle to the mobile terminal if the photo is not stored.

According to an embodiment of the present invention, after the step of utilizing the photo sharing platform to sort and determine whether the photo of the same location is already stored according to the location information, the photo taking control method further comprises:
utilizing the mobile terminal to determine whether the user adjust a photo taking condition according to the photo or the reference location and the reference photo-taking angle sent from the photo sharing platform; and
if not, then informing the user to perform a panoramic pre-recording function.

According to an embodiment of the present invention, after the step of utilizing the mobile terminal to determine whether the user adjust the photo taking condition according to the photo or the reference location and the reference photo-taking angle sent from the photo sharing platform, the photo taking control method further comprises:
utilizing the mobile terminal to receive an operation command from the user to mark a region that the user clicks on in the panoramic pre-recording function.

According to an embodiment of the present invention, after the step of utilizing the mobile terminal to receive the operation command from the user to mark the region that the user clicks on in the panoramic pre-recording function, the photo taking control method further comprises:
utilizing the mobile terminal to perform a comparison within the marked region and a comparison between the marked region and an external region such that a targeted object, which needs to be emphasized, is identified.

According to an embodiment of the present invention, after the step of identifying the targeted object, the photo taking control method further comprises:
utilizing the mobile terminal to perform a color and size comparison between the targeted object and an adjacent object and provide the user with a best photo taking location and photo taking angle according to a comparison result.

According to an embodiment of the present invention, after the step of utilizing the photo sharing platform to sort and determine whether the photo of the same location is already stored according to the location information, the photo taking control method further comprises:
utilizing the mobile terminal to take the photo and inquire the user whether to upload the photo to the photo sharing platform; and
if yes, then sending the photo and the photo taking location to the photo sharing platform.

According to an embodiment of the present invention, after the step of sending the photo and the photo taking location to the photo sharing platform, the photo taking control method further comprises:
utilizing the photo sharing platform to show the photo sent from the mobile terminal, receive comments or recommendations on the photo from another user, and send the comments or the recommendations to the mobile terminal.

According to an embodiment of the present invention, a photo taking control system is disclosed. The photo taking control system comprises: a photo sharing platform, configured to pre-store a photo and a photo taking location, descending sort photos corresponding to the photo taking location according to an attention degree, and sort and determine whether a photo of a same location is already stored according to the location information and send a photo sorted in a comparatively top position to the mobile terminal to the user as a photo taking reference if the photo is already stored; and a mobile terminal, configured to receive a user command to turn on a camera, real-time obtain location information of a current location of a user, and send the location information to a photo sharing platform.

According to an embodiment of the present invention, a storage medium is disclosed. The storage medium stores a computer program. The computer program is executed to perform following steps: establishing a connection with a photo sharing platform and utilizing the photo sharing platform to pre-store a photo and a photo taking location, and descending sort photos corresponding to the photo taking location according to an attention degree; receiving a user command to turn on a camera and displaying a positioning camera mode; receiving a user operation to turn on the positioning camera mode and real-time obtaining location information of a current location of a user; utilizing a mobile terminal to send the location information to a photo sharing platform, wherein the location information is used to indicate the photo sharing platform to sort and determine whether a photo of a same location is already stored according to the location information and to generate a reference information according to a determination result; and receiving the reference information as a photo taking reference for the user, wherein if the determination result indicates that the photo of the same location is already stored, then the reference information includes a photo, corresponding to the same location, sorted in a comparatively top position in the photo sharing platform.

According to an embodiment of the present invention, the operation of real-time obtaining location information of the current location of the user comprises:

real-time obtaining location information of the current location of the user according one or more of GPS positioning, LBS positioning, WiFi positioning, A-GPS positioning and GPS-one positioning.

According to an embodiment of the present invention, the operation of receiving the reference information further comprises:

if the photo is not stored, then the reference information includes a reference location and a reference photo-taking angle obtained by the photo sharing platform utilizing a network map to search a photo scene according to the location information.

According to an embodiment of the present invention, after the operation of utilizing a mobile terminal to send the location information to a photo sharing platform, the storage medium is executed to further perform a following operation:

determining whether the user adjust a photo taking condition according to the photo or the reference location and the reference photo-taking angle sent from the photo sharing platform; and if not, then informing the user to perform a panoramic pre-recording function.

According to an embodiment of the present invention, after the operation of utilizing the mobile terminal to determine whether the user adjust the photo taking condition according to the photo or the reference location and the reference photo-taking angle sent from the photo sharing platform comprises:

receiving an operation command from the user to mark a region that the user clicks on in the panoramic pre-recording function.

According to an embodiment of the present invention, after the operation of receiving the operation command from the user to mark the region that the user clicks on in the panoramic pre-recording function, the storage medium is executed to further perform a following operation:

focusing on the marked region to perform a comparison within the marked region and a comparison between the marked region and an external region such that a targeted object, which needs to be emphasized, is identified.

According to an embodiment of the present invention, after the operation of identifying the targeted object, the storage medium is executed to further perform a following operation:

performing a color and size comparison between the targeted object and an adjacent object and provide the user with a best photo taking location and photo taking angle according to a comparison result.

According to an embodiment of the present invention, after the operation of sorting and determining whether the photo of the same location is already stored according to the location information, the storage medium is executed to further perform a following operation:

taking the photo and inquiring the user whether to upload the photo to the photo sharing platform; and if yes, then sending the photo and the photo taking location to the photo sharing platform.

According to an embodiment of the present invention, after the operation of taking the photo and inquiring the user whether to upload the photo to the photo sharing platform, the storage medium is executed to further perform a following operation:

receiving comment information from the photo sharing platform, wherein the comment information are comments or recommendations on the photo, sent from the mobile terminal, from another user received by the photo sharing platform.

An embodiment of the present invention discloses a photo taking control method based on a mobile terminal. The photo taking control method comprises: utilizing a photo sharing platform to pre-store a photo and a photo taking location, and descending sort photos corresponding to the photo taking location according to an attention degree; utilizing a mobile terminal to receive a user command to turn on a camera and real-time obtain location information of a current location of a user; utilizing the mobile terminal to send the location information to a photo sharing platform; and utilizing the photo sharing platform to sort and determine whether a photo of a same location is already stored according to the location information and send a photo sorted in a comparatively top position to the mobile terminal as a photo taking reference for the user if the photo is already stored. The above-mentioned photo taking method allows the user obtains a photo taken by another person from the photo sharing platform according to the location information. Thus, the user could get experiences the photo and improves the effect of his taken photo.

DESCRIPTION OF SPECIFIC EMBODIMENTS OF THE INVENTION

Figure 1:
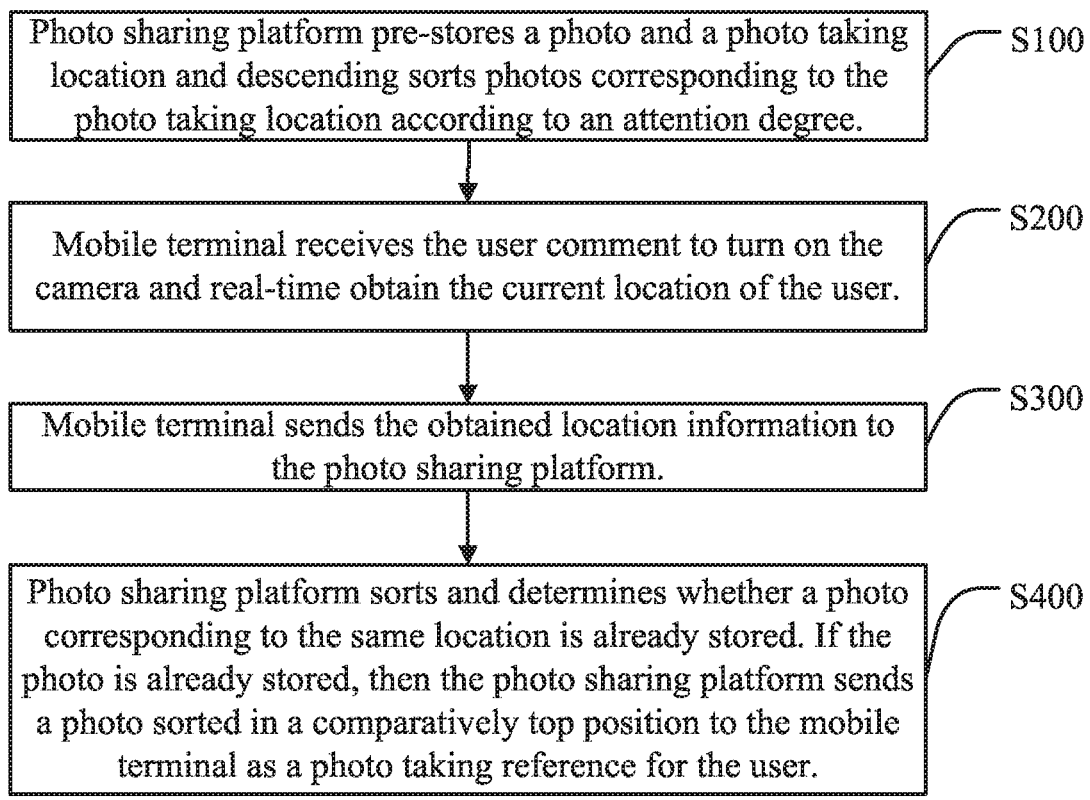
FIG. 1 is a flow chart of a photo taking control method according to an embodiment of the present invention.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Please refer to FIG. 1. FIG. 1 is a flow chart of a photo taking control method according to an embodiment of the present invention. The photo taking control method comprises:

Step S100: The photo sharing platform pre-stores a photo and a photo taking location and descending sorts photos corresponding to the photo taking location according to an attention degree.

For example, multiple users (it could be understood that the users here represent the users of the photo sharing platform, not the users of the mobile terminal) upload photos of the Mountain Taisen. Then, the photo sharing platform establishes a photo display region according to the photo taking location "Mountain Taisen." And then, the professional photographer and/or other users score the photos, give comments on the photos, or press "Like" on the photos of the Mountain Taisen. One having a higher score, more comments, or more "Likes" is regarded to have a higher attention degree and thus is descending sorted.

Surely, the professional photographer could provide the photo and the photo taking location. The photo sharing platform could establish the photo display region in the same way. Then, the users could store, comments, or press "Like" so that the photo sharing platform could descending sort the photos according to the attention degree.

In addition, the displayed photo shown in the photo sharing platform could include the user's own photograph experience, such as "if you want to take a photo of Statute of Liberty, please go to South Ferry."

S200: The mobile terminal receives the user comment to turn on the camera and real-time obtain the current location of the user.

In this embodiment, the step of receiving the user comment to turn on the camera and real-time obtaining the current location of the user comprises:

S210: The mobile terminal receives a user command to turn on a camera and display a positioning camera mode;

S220: The mobile terminal receives a user operation to turn on the positioning camera mode to real-time obtain location information of a current location of the user.

In the actual implementation, the location information could be obtained through one or more of GPS positioning, LBS positioning, WiFi positioning, A-GPS positioning and GPS-one positioning.

A-GPS: The full name is network assisted GPS positioning. The cell phone could receive a GPS signal but need the base station's assistance to perform the positioning more efficiently and accurately. Theoretically, A-GPS could be used in all kinds of networks provided by all service providers.

GPS-one: This is a positioning technique based on CDMA standard developed by Qualcomm. The chip on the cell phone loads the module supporting the GPS-one protocol to perform the positioning.

The advantage of the A-GPS is the positioning resolution. In the outdoors, the resolution could be 10 meters. However, the disadvantage of the A-GPS is that the resolution enormously decreases in the indoors. The GPS-one utilizes the A-GPS to perform the positioning in the outdoors and utilizes the base station or wireless network to perform the positioning in the indoors because the satellite signal is weaker.

On the street of a city, different positioning techniques have different positioning resolutions. If they are arranged by their positioning resolutions, then the arrangement, from low to high, is WiFi positioning, base station positioning, and GPS positioning. In contrast, in a building having a lot of wireless access points, WiFi positioning could have a better resolution and thus may have similar resolution of the outdoor GPS positioning. The present invention could smartly perform the positioning according to different locations.

S300: The mobile terminal sends the obtained location information to the photo sharing platform.

The above step is the first step for matching a photo corresponding to the same location according to the location information. The next step is:

S400: The photo sharing platform sorts and determines whether a photo corresponding to the same location is already stored. If the photo is already stored, then the photo sharing platform sends a photo sorted in a comparatively top position to the mobile terminal as a photo taking reference for the user.

In this embodiment, the step S400 further comprises: if the photo is not stored, then utilizing a network map to search a photo scene and sends a reference location and a reference photo-taking angle to the mobile terminal.

The above step is to supplement the contents of the photo sharing platform. In the condition that the user cannot obtain the photograph experience from the photo sharing platform, the network map could be used to search a nearby scene, a proper photo-taking location, or a photo-taking angle for the user as a photo-taking reference.

In this embodiment, after the step S400, the method further comprises:

S500: The mobile terminal determines whether the user adjust a photo taking condition according to the photo or the reference location and the reference photo-taking angle sent from the photo sharing platform. If not, then the mobile terminal informs the user to perform a panoramic pre-recording function.

When the user does not satisfy with the photo obtained from the photo sharing platform, the mobile terminal could provide the panoramic pre-recording function to process the photo for compensation. This allows the user to take a favorite photo of a better effect. The panoramic pre-recording function is a conventional function and further illustration is omitted here for simplicity.

The process is as below: Step S600: The mobile terminal receives an operation command from the user to mark a region that the user clicks on in the panoramic pre-recording function.

The user could mark one or multiple regions. The importance degree of the multiple regions could be determined by the user's marking order.

After the step S600, the method further comprises:

Step S700: The mobile terminal performs a comparison within the marked region and a comparison between the marked region and an external region such that a targeted object, which needs to be emphasized, is identified.

The target object is an object that the user would like to emphasize. Surely, the user could mark an object that the user would like to hide/cover, such as a trash can. Or, the user could mark different objects, which include a target object and an object to be covered. The mark could be implemented in different ways and is easy to implement. For example, the mobile terminal could provide two option columns on its display, where one is for selecting the target object and the other one is for selecting the object to be covered. Then, the user could select the option column first and then select the region. Further illustration is omitted her for simplicity.

Step S800: The mobile terminal performs a color and size comparison between the targeted object and an adjacent object and provides the user with a best photo taking location and photo taking angle according to a comparison result.

Step S-X: The mobile terminal finishes the photo taking, inquires the user whether to upload the photo to the photo sharing platform and receives the user operation command. If yes, then the mobile terminal sends the photo and the photo taking location to the photo sharing platform.

Step S-Y: The photo sharing platform shows the photo sent from the mobile terminal, receives comments or recommendations on the photo from another user, and sends the comments or the recommendations to the mobile terminal.

Here, the steps S-X and S-Y could be put before the step S400 or after the step S400.

Figure 2:
FIG. 2 is a function block diagram of a photo taking system according to an embodiment of the present invention.

Please refer to FIG. 2. FIG. 2 is a function block diagram of a photo taking system according to an embodiment of the present invention. The photo taking system comprises: a photo sharing platform 10 and a mobile terminal 20. The photo sharing platform 10 is configured to pre-store a photo and a photo taking location, descending sort photos corresponding to the photo taking location according to an attention degree, and sort and determine whether a photo of a same location is already stored according to the location information and send a photo sorted in a comparatively top position to the mobile terminal as a photo taking reference for the user if the photo is already stored. The mobile terminal 20 is configured to receive a user command to turn on a camera, real-time obtain location information of a current location of a user, and send the location information to the photo sharing platform 10.

Figure 3:
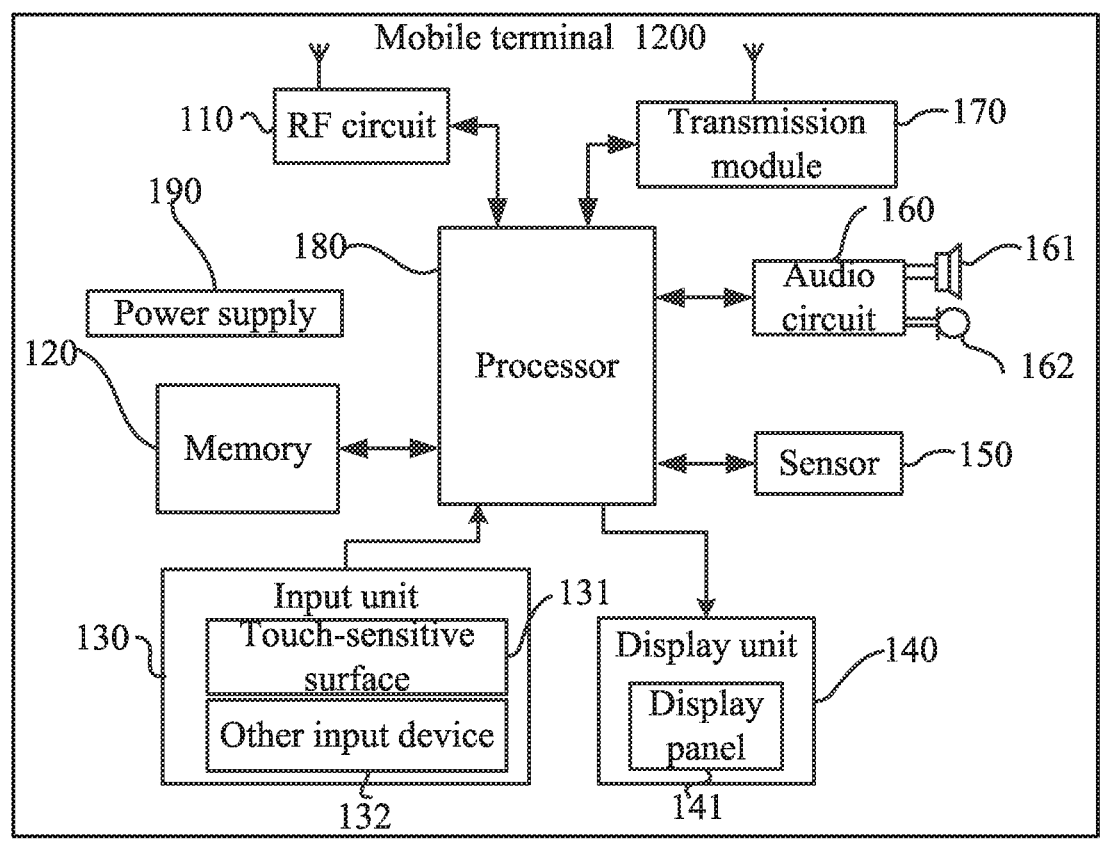
FIG. 3 is a diagram of a structure of a mobile terminal according to an embodiment of the present invention.

Please refer to FIG. 3. FIG. 3 is a diagram of a structure of a mobile terminal according to an embodiment of the present invention. The mobile terminal 1200 could be used to implement the above-mentioned photo taking control method or system. The mobile terminal 1200 could be a smart phone or a tablet.

As shown in FIG. 3, the mobile terminal 1200 could comprise a radio frequency (RF) circuit 110, a storage device 120 having one or more computer readable storage media (only one is shown), an input unit 130, a display unit 140, a sensor 150, an audio circuit 160, a transmission module 170, a processor 180 having one or more cores (only one is shown), and a power supply 190. Please note, the structure of the mobile terminal 1200 of this embodiment should be regarded as an example, not a limitation of the present invention. In the actual implementation, less or more components could be included in the mobile terminal or different arrangement could be implemented. These changes all belong to the scope of the present invention.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller.

The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 may further comprise a camera (such as a front camera, a rear camera), a Bluetooth module, and the like, and a description in this regard is not provided. In greater detail, a display unit of the mobile terminal is a touch screen display according to the present embodiment. The mobile terminal 1200 further comprises a storage device and one or more programs (instructions) stored in the storage device. These programs (instructions) are executed by one or more processors to perform the above-mentioned photo taking control method.

The present invention further provides a storage medium. The storage medium stores a computer program. The computer program could be executed to perform the above-mentioned photo taking control method based on the mobile terminal.

The photo taking control method comprises: establishing a connection with a photo sharing platform and utilizing the photo sharing platform to pre-store a photo and a photo taking location, and descending sort photos corresponding to the photo taking location according to an attention degree;

receiving a user command to turn on a camera and displaying a positioning camera mode;

receiving a user operation to turn on the positioning camera mode and real-time obtaining location information of a current location of a user;

utilizing a mobile terminal to send the location information to a photo sharing platform, wherein the location information is used to indicate the photo sharing platform to sort and determine whether a photo of a same location is already stored according to the location information and to generate a reference information according to a determination result; and receiving the reference information as a photo taking reference for the user, wherein if the determination result indicates that the photo of the same location is already stored, then the reference information includes a photo, corresponding to the same location, sorted in a comparatively top position in the photo sharing platform.

Furthermore, the operation of real-time obtaining location information of the current location of the user comprises:

real-time obtaining location information of the current location of the user according one or more of GPS positioning, LBS positioning, WiFi positioning, A-GPS positioning and GPS-one positioning.

Furthermore, the operation of receiving the reference information further comprises:

if the photo is not stored, then the reference information includes a reference location and a reference photo-taking angle obtained by the photo sharing platform utilizing a network map to search a photo scene according to the location information.

Furthermore, after the operation of utilizing a mobile terminal to send the location information to a photo sharing platform, the storage medium is executed to further perform a following operation:

determining whether the user adjust a photo taking condition according to the photo or the reference location and the reference photo-taking angle sent from the photo sharing platform; and if not, then informing the user to perform a panoramic pre-recording function.

Furthermore, after the operation of utilizing the mobile terminal to determine whether the user adjust the photo taking condition according to the photo or the reference location and the reference photo-taking angle sent from the photo sharing platform comprises:

receiving an operation command from the user to mark a region that the user clicks on in the panoramic pre-recording function.

Furthermore, after the operation of receiving the operation command from the user to mark the region that the user clicks on in the panoramic pre-recording function, the storage medium is executed to further perform a following operation:

focusing on the marked region to perform a comparison within the marked region and a comparison between the marked region and an external region such that a targeted object, which needs to be emphasized, is identified.

Furthermore, after the operation of identifying the targeted object, the storage medium is executed to further perform a following operation:

performing a color and size comparison between the targeted object and an adjacent object and provide the user with a best photo taking location and photo taking angle according to a comparison result.

Furthermore, after the operation of sorting and determining whether the photo of the same location is already stored according to the location information, the storage medium is executed to further perform a following operation:

taking the photo and inquiring the user whether to upload the photo to the photo sharing platform; and if yes, then sending the photo and the photo taking location to the photo sharing platform.

Furthermore, after the operation of taking the photo and inquiring the user whether to upload the photo to the photo sharing platform, the storage medium is executed to further perform a following operation:

receiving comment information from the photo sharing platform, wherein the comment information are comments or recommendations on the photo, sent from the mobile terminal, from another user received by the photo sharing platform.

Above are embodiments of the present invention, which does not limit the scope of the present invention. Any modifications, equivalent replacements or improvements within the spirit and principles of the embodiment described above should be covered by the protected scope of the invention.

What is claimed is:

1. A photo taking control method used in a mobile terminal, the photo taking control method comprising:
   utilizing a photo sharing platform to pre-store a photo and a photo taking location and descending sort photos corresponding to the photo taking location according to an attention degree;
   utilizing a mobile terminal to receive a user command to turn on a camera and real-time obtain location information of a current location of a user;
   utilizing the mobile terminal to send the location information to a photo sharing platform; and
   utilizing the photo sharing platform to sort and determine whether a photo of a same location is already stored according to the location information;
   sending a photo sorted in a comparatively top position to the mobile terminal as a photo taking reference for the user if the photo is already stored;
   utilizing a network map to search a photo scene and send a reference location and a reference photo-taking angle to the mobile terminal if the photo is not stored.

2. The photo taking control method of claim 1, wherein the step of real-time obtaining location information of the current location comprises:
   real-time obtaining location information of the current location of the user according one or more of GPS positioning, LBS positioning, WiFi positioning, A-GPS positioning and GPS-one positioning.

3. The photo taking control method of claim 1, wherein after the step of utilizing the photo sharing platform to sort and determine whether the photo of the same location is already stored according to the location information, the photo taking control method further comprises:
   utilizing the mobile terminal to determine whether the user adjust a photo taking condition according to the photo or the reference location and the reference photo-taking angle sent from the photo sharing platform; and
   if not, then informing the user to perform a panoramic pre-recording function.

4. The photo taking control method of claim 3, wherein after the step of utilizing the mobile terminal to determine whether the user adjust the photo taking condition according to the photo or the reference location and the reference photo-taking angle sent from the photo sharing platform, the photo taking control method further comprises:
   utilizing the mobile terminal to receive an operation command from the user to mark a region that the user clicks on in the panoramic pre-recording function.

5. The photo taking control method of claim 4, wherein after the step of utilizing the mobile terminal to receive the operation command from the user to mark the region that the user clicks on in the panoramic pre-recording function, the photo taking control method further comprises:

utilizing the mobile terminal to perform a comparison within the marked region and a comparison between the marked region and an external region such that a targeted object, which needs to be emphasized, is identified.

6. The photo taking control method of claim 5, wherein after the step of identifying the targeted object, the photo taking control method further comprises:

utilizing the mobile terminal to perform a color and size comparison between the targeted object and an adjacent object and provide the user with a best photo taking location and photo taking angle according to a comparison result.

7. The photo taking control method of claim 1, wherein after the step of utilizing the photo sharing platform to sort and determine whether the photo of the same location is already stored according to the location information, the photo taking control method further comprises:

utilizing the mobile terminal to take the photo and inquire the user whether to upload the photo to the photo sharing platform; and if yes, then sending the photo and the photo taking location to the photo sharing platform.

8. The photo taking control method of claim 7, wherein after the step of sending the photo and the photo taking location to the photo sharing platform, the photo taking control method further comprises:

utilizing the photo sharing platform to show the photo sent from the mobile terminal, receive comments or recommendations on the photo from another user, and send the comments or the recommendations to the mobile terminal.

* * * * *